(12) United States Patent
Jeong et al.

(10) Patent No.: US 10,136,424 B2
(45) Date of Patent: Nov. 20, 2018

(54) EXTENDED DSME MAC FOR LOW POWER UTILITY MONITORING SERVICE

(71) Applicant: Electronics and Telecommunications Research Institute, Daejeon (KR)

(72) Inventors: Wun Cheol Jeong, Daejeon (KR); Chang Sub Shin, Daejeon (KR); Tae Joon Park, Daejeon (KR); Ho Yong Kang, Daejeon (KR); In Hwan Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 418 days.

(21) Appl. No.: 14/383,019

(22) PCT Filed: Mar. 8, 2013

(86) PCT No.: PCT/KR2013/001910
§ 371 (c)(1),
(2) Date: Sep. 4, 2014

(87) PCT Pub. No.: WO2013/133674
PCT Pub. Date: Sep. 12, 2013

(65) Prior Publication Data
US 2015/0305023 A1    Oct. 22, 2015

Related U.S. Application Data

(60) Provisional application No. 61/608,848, filed on Mar. 9, 2012.

(30) Foreign Application Priority Data

Mar. 8, 2013   (KR) .................. 10-2013-0025124

(51) Int. Cl.
*H04W 72/04* (2009.01)
*H04W 48/12* (2009.01)
(Continued)

(52) U.S. Cl.
CPC ......... *H04W 72/0446* (2013.01); *H04W 4/70* (2018.02); *H04W 40/244* (2013.01);
(Continued)

(58) Field of Classification Search
CPC ................................................ H04W 72/0446
See application file for complete search history.

(56) References Cited

U.S. PATENT DOCUMENTS

2010/0034159 A1* 2/2010 Shin .................. H04W 72/1257
370/329
2010/0322209 A1* 12/2010 Mizuno ............... H04W 72/082
370/336
(Continued)

FOREIGN PATENT DOCUMENTS

KR        10-0810661         3/2008
KR     10-2009-0005844        1/2009
(Continued)

OTHER PUBLICATIONS

IEEE Computer Society, LAN/MAN Standards Committee, "IEEE Standard for Local and Metropolitan Area Networks. Part 15.4: Low Rate Wireless Personal Area Networks (LR-WPANs) Amendment to the MAC sub-layer," IEEE 802.15 Working Group for Wireless Personal Area Networks, 14 pages (2011).
(Continued)

*Primary Examiner* — Hassan Kizou
*Assistant Examiner* — Abdullahi Ahmed
(74) *Attorney, Agent, or Firm* — William Park & Associates Ltd.

(57) ABSTRACT

A method of configuring a multi-superframe is provided. The method includes setting at least one parameter for
(Continued)

configuring the multi-superframe, and configuring the multi-superframe corresponding to the at least one parameter, wherein the at least one parameter includes a superframe order (SO), a beacon order (BO), and a multi-superframe order (MO), in a form of positive integers, and the setting includes setting the MO to have a value higher than the BO.

11 Claims, 9 Drawing Sheets

(51) Int. Cl.
    *H04W 40/24*    (2009.01)
    *H04W 4/70*     (2018.01)
(52) U.S. Cl.
    CPC ............ *H04W 48/12* (2013.01); *Y02D 70/00* (2018.01); *Y02D 70/144* (2018.01)

(56) References Cited

U.S. PATENT DOCUMENTS

| | | | | |
|---|---|---|---|---|
| 2012/0093056 A1* | 4/2012 | Shin | ...................... | H04W 80/00 370/312 |
| 2012/0201193 A1* | 8/2012 | Sugiyama | .............. | H04B 7/155 370/315 |
| 2012/0320881 A1* | 12/2012 | Hong | ................... | H04B 7/2646 370/336 |

FOREIGN PATENT DOCUMENTS

| | | |
|---|---|---|
| KR | 20110076259 A | 7/2011 |
| KR | 10-1213474 | 12/2012 |
| WO | 2013/133674 | 9/2013 |

OTHER PUBLICATIONS

Joo, Seong-Soon et al., "Enhanced MAC for the Bounded Access Delay," 2010 International Conference on Information and Communication Technology Convergence, pp. 423-424 (2010).

Lee, Woon-yong et al., "Distributed Fast Beacon Scheduling for Mesh Networks," 2011 Eighth IEEE International Conference on Mobile Ad-Hoc and Sensor Systems, pp. 727-732 (2011).

International Search Report and Written Opinion for Application No. PCT/KR2013/001910, 9 pages, dated Jun. 18, 2013.

\* cited by examiner

| Bits: 0 | 1-4 | 5 | 6-7 |
|---|---|---|---|
| Direction | Allocation Order | Hopping Sequence Request | Reserved |

| Octets: variable | 1 | 2 | 1 | 0/1 | variable | 0/1 | 0/1 | 0/2 | 0/1 | 0/2 |
|---|---|---|---|---|---|---|---|---|---|---|
| MHR fields | Command Frame Identifier | Short Address | Association Status | Hopping Sequence Length | Hopping Sequence | Allocation Order | BI Index | Superframe ID | Slot ID | Channel Index |

FIG. 9

EXTENDED DSME MAC FOR LOW POWER UTILITY MONITORING SERVICE

CROSS-REFERENCE TO RELATED APPLICATIONS

This application is a 35 U.S.C. 371 national stage filing of International Application PCT/KR2013/001910, filed 8 Mar. 2013, which claims priority to Korean patent application 10-2013-0025124, filed 8 Mar. 2013 and U.S. Provisional patent application 61/608,848, filed Mar. 9, 2012, the entire contents of each of which are hereby incorporated by reference.

TECHNICAL FIELD

The present invention relates to an advanced technology of an IEEE802.15.4e Deterministic and Synchronous Multichannel Extension Media Access Control (DSME MAC) protocol used in a wireless sensor network as a MAC protocol having high reliability and low latency, and more particularly to an extended DSME MAC technology for adaptively supporting a low power utility monitoring services having long data sampling cycles and short cycles.

BACKGROUND ART

Recently, a need for a wireless sensor network system requiring high reliability and low latency in industrial applications is increasing. To satisfy such a demand, the wireless sensor network system has the following characteristics.

First, issues of channel interference and collision should be resolved by using a multichannel, instead of a conventional single channel, thereby improving reliability.

Further, a delay time should be ensured or minimized using a time division channel access method instead of a competition-based channel access mechanism so as to resolve a delay in data transmission time between endpoint nodes.

In addition, the system should have a long network life of several years, or over ten years, without a need for battery replacement of a monitoring application service having a long data sampling cycle, such as a smart grid or a smart utility.

However, the IEEE802.15.4e Deterministic and Synchronous Multichannel Extension Media Access Control (DSME MAC) protocol, introduced previously in a wireless sensor network as an MAC protocol having reliability and low latency, has limitations in supporting a long data generation cycle and difficulties in adaptively dealing with an application service having different data generation cycles and involves redundant power consumption due to separate procedures for network association and time slot allocation. Thus, a demand exists for solutions to these issues.

DISCLOSURE OF INVENTION

Technical Solutions

According to an exemplary embodiment, there is provided a method of configuring a multi-superframe including setting at least one parameter to configure the multi-superframe, and configuring the multi-superframe corresponding to the at least one parameter, wherein the at least one parameter includes a superframe order (SO), a beacon order (BO), and a multi-superframe order (MO), in a form of positive integers, and the setting sets the MO to have a value higher than the BO.

The setting may set the MO to a value greater than or equal to the SO and less than or equal to a first value.

The first value may be 22.

The configuring may configure the multi-superframe such that each multi-superframe comprises a $\text{floor}(2^{(MO-BO)})$ number of beacon intervals (BIs), floor(x) being a function to output a maximum integer less than or equal to x.

The at least one parameter may further include an allocation order (AO) of a positive integer selected by a node device associated with the method, and a time slot allocation cycle of the node device is determined by calculating a value of $2^{(MO-BO)}/2^{AO}$.

A time slot allocation location of the node device may be determined by a Deterministic and Synchronous Multichannel Extension-Guaranteed Time Slot (DSME-GTS) slot description, and the DSME-GTS slot description comprises a BI index as an identification index of a BI associated with the time slot allocation location over a duration of the configured multi-superframe, a SuperframeID as an identification index of a superframe associated with a location of the AO with respect to a time slot within the BI, and a SlotID as an identification index of a time slot within the BI.

According to an exemplary embodiment, there is provided a method of allocating a time slot by a node device forming a wireless sensor network, the method including determining an AO of a positive integer to determine a time slot allocation cycle, and allocating the time slot based on the AO.

The node device may be an apparatus for configuring a multi-superframe using an SO, a BO, and an MO, in a form of positive integers, the MO being set to have a value higher than the BO, and the allocating of the time slot may determine the time slot allocation cycle by calculating a value of $2^{(MO-BO)}/2^{AO}$ using the AO.

An allocation location of the time slot may be determined by a DSME-GTS slot description, and the DSME-GTS slot description comprises a BI index as an identification index of a BI associated with the time slot allocation location over a duration of the configured multi-superframe, a SuperframeID as an identification index of a superframe associated with a location of the AO with respect to a time slot within the BI, and a SlotID as an identification index of a time slot within the BI.

According to an exemplary embodiment, there is provided a node device forming a wireless sensor network, the node device including a management unit to set and manage at least one parameter for configuring a multi-superframe and a configuration unit to configure the multi-superframe corresponding to the at least one parameter, wherein the at least one parameter includes an SO, a BO, and a MO, in a form of positive integers, and the management unit sets the MO to have a value higher than the BO.

The management unit may set the MO to a value greater than or equal to the SO and less than or equal to a first value.

The configuration unit may configure the multi-superframe such that each multi-superframe comprises $\text{floor}(2^{(MO-BO)})$ BIs, floor(x) being a function to output a maximum integer not greater than x.

The node device may further include a control unit to turn off a transceiver except when a beacon is being received in a time slot allocated by the multi-superframe and in a commencement of at least one beacon period included in the multi-superframe.

The node device may include a DSME Association Type field and an Extended DSME-GTS Allocation field in a DSME-Association request for network association defined in a DSME Media Access Control (MAC) standard when joining the wireless sensor network, the DSME Association Type field being a binary index file to distinguish a DSME MAC association procedure and the Extended DSME-GTS Allocation field indicating time slot allocation request information which is activated when the DSME Association Type field is 1.

BEST MODE FOR CARRYING OUT THE INVENTION

Hereinafter, exemplary embodiments of the present invention will be described in detail with reference to the accompanying drawings. However, the present invention is not limited to the exemplary embodiments. Also, like reference numerals refer to the like elements throughout.

Although the terms used in this specification are selected from general terms being widely used in consideration of functions in the present invention but may be changed depending on the intent of a person having ordinary skill in the art to which this invention belongs, customs and practices, or the appearance of novel technology.

Further, in some cases, terms are selected at random by an applicant for the purpose of understanding particular embodiments and/or for the sake of convenient description, in which these terms are defined in relevant descriptions to specify their meaning in detail. Accordingly, the terms used herein should be defined based on their meaning and the following overall description of this specification.

Figure 1:
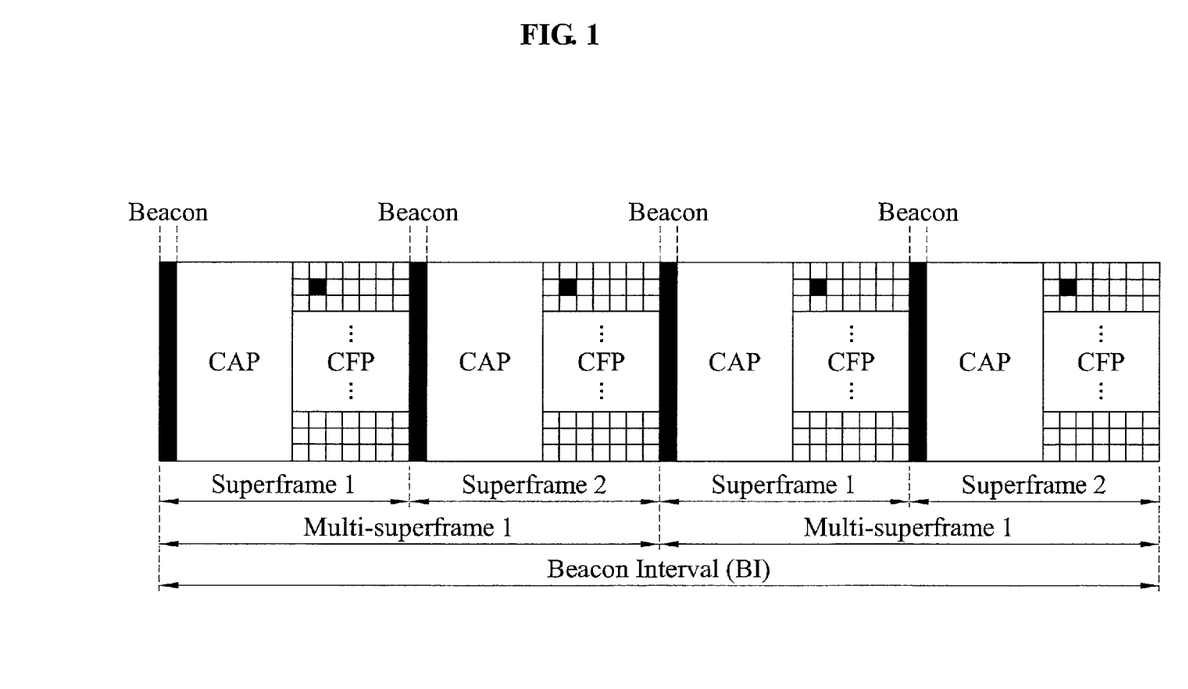
FIG. 1 illustrates a multi-superframe structure according to an exemplary embodiment of the present invention.

FIG. 1 illustrates a multi-superframe structure according to an exemplary embodiment.

An IEEE802.15.4e Deterministic and Synchronous Multichannel Extension Media Access Control (DSME MAC) protocol specifies a multi-superframe structure that is an extension of superframe structure defined in IEEE 802.15.4 beacon-enabled mode to support reliability and low latency.

The multi-superframe structure is a cycle of repeated beacon intervals (BIs), wherein each BI is formed of a plurality of superframes. Each superframe is divided into three sections, including a first beacon period that is a beacon transmission period for time synchronization between node devices forming a network, a contention access period (CAP) and a contention free period (CFP) sequentially located for communications between the node devices.

A time period of one multi-superframe is a Multi-superframe Duration (MD), and a time period of one superframe is a Superframe Duration (SD).

The CAP allows access to a channel using a Carrier Sense Multiple Access with Collision Avoidance (CSMA/CA) protocol as a random channel access method, the CFP includes seven timeslots, and a pair of node devices to exchange data frames using a reserved time slot, through a reservation method.

The multi-superframe structure is specified with parameters with a positive integer value, a Beacon Order (BO), a Multi-superframe Order (MO), and a Superframe Order (SO), sharing a relationship as indicated in Equation 1.

$$BI = \text{aBaseSuperframeDuration} \times 2^{BO} \text{ symbols,}$$

$$SD = \text{aBaseSuperframeDuration} \times 2^{SO} \text{ symbols,}$$

$$MD = \text{aBaseSuperframeDuration} \times 2^{MO} \text{ symbols} \quad \text{[Equation 1]}$$

Here, aBaseSuperframeDuration is a minimum SD and has a symbol rate of 960. Further, relations between BO, MO, and SO are expressed by Equation 2.

$$0 \leq SO \leq MO \leq BO \leq 14 \quad \text{[Equation 2]}$$

In the multi-superframe structure, reserving at least one time slot within one MD may be necessary to support communications between node devices.

In the multi-superframe structure, data communications between node devices are achieved in the CFP using channel diversity, thus obtaining a channel multiplexing gain through a multichannel and increasing reliability in a wireless period. Also, the multi-superframe structure may minimize a delay in transmission of a data frame in a link layer and guarantee a deterministic time delay through time division access via reservation.

In order to apply a wireless sensor network system to a service having a relatively long data generation cycle, for example, a cycle of generating a target measurement once a day, such as a smart grid or smart utility monitoring application service, a MAC protocol is designed in consideration of such a data generation cycle to satisfy a long network operating time of the application services, for example, 10 years or longer. Further, the services have different data generation cycles based on network configurations, instead of one data generation cycle.

However, a general multi-superframe structure is limited to a maximum data transmission cycle of BO=14 occurring more frequently than a data generation cycle of an actual service, resulting in channel and time slot resources being wasted, and unnecessary power consumption.

For example, in a network having a multi-superframe with BO=14 and a data transfer rate of 62.5 ksymbol/second, a node device is allocated a time slot up to every 251.66 seconds. This example illustrates a considerably frequent allocation cycle for an application service which generates monitoring and sensing information once a day, causing substantial power consumption.

Moreover, in the general multi-superframe structure, a time slot is allocated by a multi-superframe, making it difficult to support monitoring application services that require different data generation cycles, and resulting in unnecessary power consumption for communications since each node device goes through a network association procedure and a time slot allocation procedure to transmit sensing information when forming a network with a great number of node devices.

Figure 2:
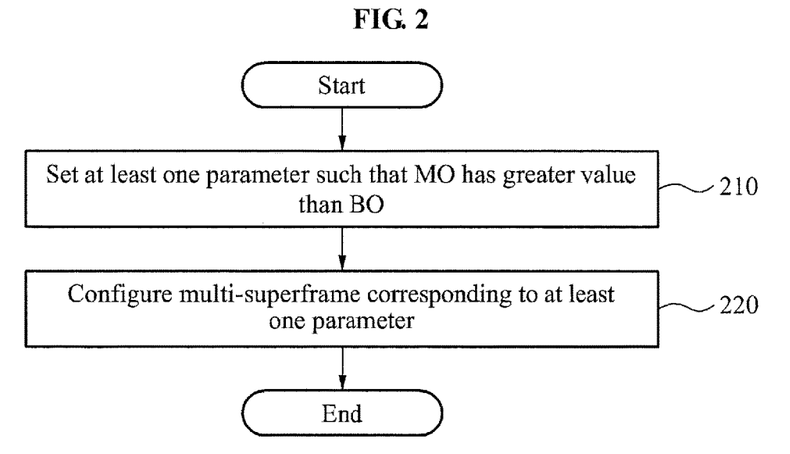
FIG. 2 is illustrates a method of configuring a multi-superframe according to an exemplary embodiment.

FIG. 2 illustrates a method of configuring a multi-superframe according to an exemplary embodiment.

In operation 210, at least one parameter is set for configuring a multi-superframe.

The at least one parameter may include an SO, a BO, and an MO, having values in a form of positive integers.

In this instance, in operation 210, the MO may be set to have a value higher than the BO.

Also, in operation 210, the MO may be set to a value to be greater than or equal to the SO and less than or equal to a first value, wherein the first value is 22.

In operation 220, the multi-superframe may be configured based on the at least one parameter, in which each multi-superframe may include a floor($2^{(MO-BO)}$) number of BIs, floor(x) being a function to output a maximum integer less than or equal to x.

The at least one parameter may further include an allocation order (AO) that is a positive integer selected by a node device associated with the method of configuring the multi-superframe, and the node device may have a time slot allocation cycle determined by calculating a value of $2^{(MO-BO)}/2^{AO}$.

A time slot allocation location by the node device may be determined by a DSME-GTS slot description.

Here, the DSME-GTS slot description may include a BI index, a SuperframeID, and a SlotID.

The BI index is an identification index of a BI associated with a location to which the time slot is allocated within the MD.

The SuperframeID is an identification index of a superframe associated with a location of the AO with respect to the time slot within the BI.

The SlotID is an identification index of the time slot within the BI.

Figure 3:
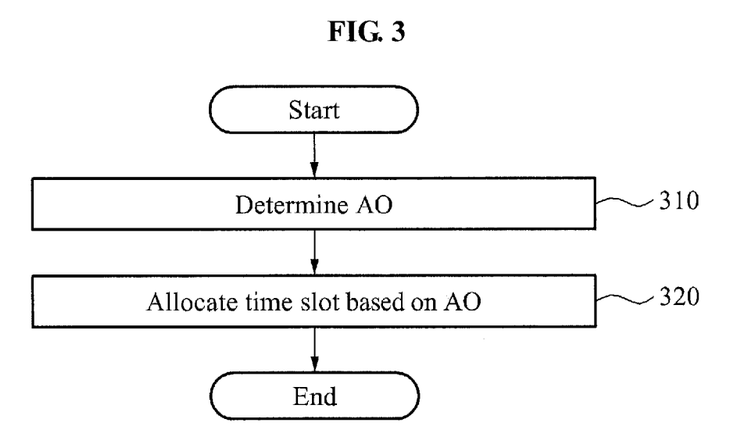
FIG. 3 illustrates a method of a node device forming a wireless sensor network allocates a time slot according to an exemplary embodiment.

FIG. 3 illustrates a method of a node device forming a wireless sensor network allocates a time slot according to an exemplary embodiment.

The node device is an apparatus for configuring a multi-superframe using an SO, a BO, and an MO having values in a form of positive integers, wherein the MO may be set to a value higher than the BO.

Further, the node device may further include an AO associated with a time slot allocation cycle.

In operation 310, as a positive integer, the AO may be determined to determine the time slot allocation cycle.

In operation 320, the time slot may be allocated based on the AO.

In operation 320, the node device may allocate the time slot allocation cycle by calculating a value of $2^{(MO-BO)}/2^{AO}$ using the AO.

A time slot allocation location by the node device may be determined by a DSME-GTS slot description. In this case, the DSME-GTS slot description may include a BI index, a SuperframeID, and a SlotID.

The BI index is an identification index of a BI associated with a location to which the time slot is allocated within the MD.

The SuperframeID is an identification index of a superframe associated with a location of the AO with respect to the time slot within the BI.

The SlotID is an identification index of the time slot within the BI.

Figure 4:
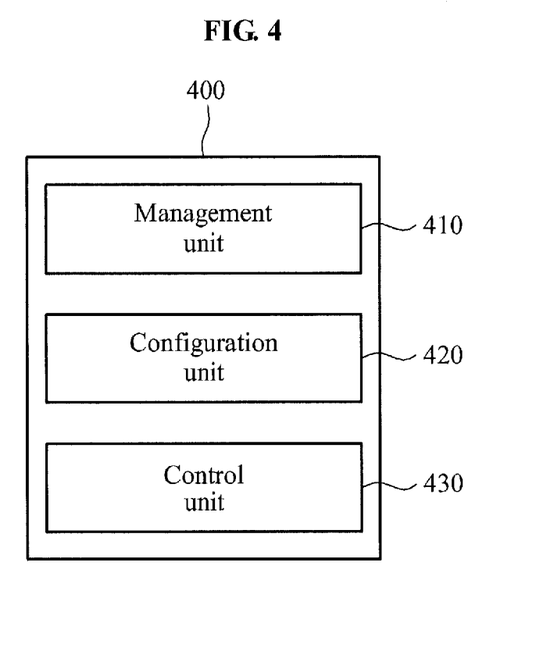
FIG. 4 illustrates a node device forming a wireless sensor network according to an exemplary embodiment.

FIG. 4 illustrates a node device 400 forming a wireless sensor network according to an exemplary embodiment.

The node device 400 may include a management unit 410, a configuration unit 420, and a control unit 430. Here, the control unit 430 is an optional element, which may be omitted in another embodiment.

The management unit 410 may set and manage at least one parameter for configuring a multi-superframe.

The at least one parameter may include an SO, a BO, and an MO having values in a form of positive integers.

In this case, the management unit 410 may set the MO to have a value higher than the BO, wherein the MO may be a value that is greater than or equal to the SO and less than or equal to a first value.

Here, the first value is 22 in accordance with IEEE802.15.4.

The configuration unit 420 may configure the multi-superframe corresponding to the at least one parameter.

The configuration unit 420 may configure the multi-superframe such that each multi-superframe includes a floor ($2^{(MO-BO)}$) number of BIs, floor(x) being a function to output a maximum integer less than or equal to x.

In another exemplary embodiment, the node device 400 may further include the control unit 430 to minimize battery power consumption.

The control unit 430 turns off a transceiver except when a beacon is being received in a time slot allocated by the multi-superframe and at a commencement of at least one beacon period included in the multi-superframe, thereby extending battery life of the node device 400 but increasing network use time.

When the node device 400 joins a wireless sensor network, the node device 400 may include a DSME Association Type field and an Extended DSME-GTS Allocation field in a DSME-Association request defined in the DSME MAC standard.

Here, the DSME Association Type field refers to a binary index field to distinguish a DSME MAC Association Procedure.

Further, the Extended DSME-GTS Allocation field is activated when the DSME Association Type field is 1, and refers to time slot allocation request information.

Figure 5:
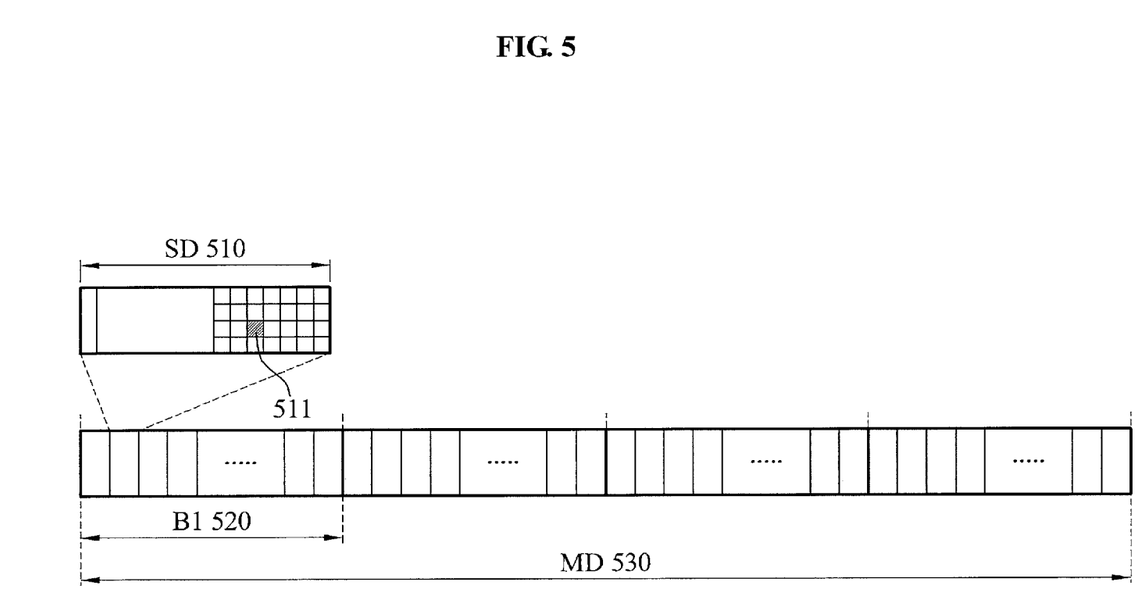
FIG. 5 illustrates an extended multi-superframe structure according to an exemplary embodiment.

FIG. 5 illustrates an extended multi-superframe structure according to an exemplary embodiment.

The extended multi-superframe structure of FIG. 5 is introduced to overcome wasting of channel/time slot resources and unnecessary power consumption, involved in use of the conventional multi-superframe structure of FIG. 1.

In order for the extended multi-superframe structure to support an application service with a relatively long data sampling cycle, relationships between BO, MO, and SO in Equation 2 may be modified as indicated in Equations 3 and 4.

$$0 \leq SO \leq BO \leq 14 \qquad \text{[Equation 3]}$$

$$SO \leq MO \leq [BO + \text{len}(BSN)] \qquad \text{[Equation 4]}$$

Equation 3 illustrates ranges of SO and BO for determining an SD and a BI, as specified in IEEE802.15.4.

Equation 4 is introduced for the extended multi-superframe to support an application service with a long data sampling cycle, which has a different multi-superframe structure from Equation 2, as specified in IEEE802.15.4e.

Here, len(BSN) denotes a digit number of a binary value representing a BSN, which is 8 when an enhanced beacon frame has a Sequence Number field, and 0 when a Sequence Number field is absent.

Further, according to Equation 2, BO goes up to 8 and len(BSN) goes up to 8 when the enhanced beacon frame has the Sequence Number field and thus, the relationships between SO and MO may be expressed by Equation 5, through these values being substituted in Equation 4.

$$0 \le SO \le MO \le 22 \qquad \text{[Equation 5]}$$

In the general multi-superframe, an MO always has a smaller value than a BO as in Equation 2 and thus, at least one multi-superframe is present in one BI. However, the extended multi-superframe may have an independent MO value by eliminating a limitation on an MO value with respect to a BO.

Referring to FIG. 5, an MO is set to a value higher than a BO, such that one MD 530 includes a plurality of BIs 520. In particular, a number of BIs 520 within one MD 530 may be expressed by Equation 6.

$$BI \text{ in } MD = \text{floor}(2^{(MO-BO)}) \qquad \text{[Equation 6]}$$

Here, a function floor(x) outputs a maximum integer no greater than x.

In comparison with the conventional multi-superframe structure, the extended multi-superframe structure may support a flexible data sampling cycle due to an extended MO value.

For instance, in a network with a data transfer rate of 62.5 ksymbol/second, when all node devices in the network are allocated one data transmission slot for one MD 530, each node device may be allocated a time slot once a maximum MD symbol by Equation 1.

By applying the foregoing to the extended multi-superframe, Equation 7 may be obtained.

$$\begin{aligned} MD &= aBaseSuperframeDuration \times 2^{MO} & \text{[symbols]} \\ &= aBaseSuperframeDuration \times 2^{MO} / \text{symbol rate} & \text{[seconds]} \\ &= 960 \times 2^{16} / 62500 & \text{[seconds]} \\ &= 10067[\text{seconds}] \cong 16.8[\text{minutes}] \end{aligned} \qquad \text{[Equation 7]}$$

In the extended multi-superframe, each node device is allocated a time slot about every 16.8 minutes.

Further, when an MO is set to up to 22, one node device in the same network configuration is allocated a time slot about every 17.9 hours.

Thus, the extended multi-superframe may support application services with a long data sampling cycle. In particular, these application services generally have a much lower transfer rate than a data transfer rate illustrated in exemplary embodiments and thus, an actual time slot allocation cycle becomes much longer.

An increased time slot allocation cycle may not only support application services with a long data sampling cycle but extend battery life of node devices to prolong a network use time.

In this instance, as shown in FIG. 2, all node devices in the network turn off transceivers except when a beacon is being received in each allocated time slot 511 and in the beginning of each BI 520, thereby minimizing battery power consumption.

In the extended multi-superframe, an extended MO may be broadcasted, being included in a beacon frame periodically broadcasted.

Figure 6:
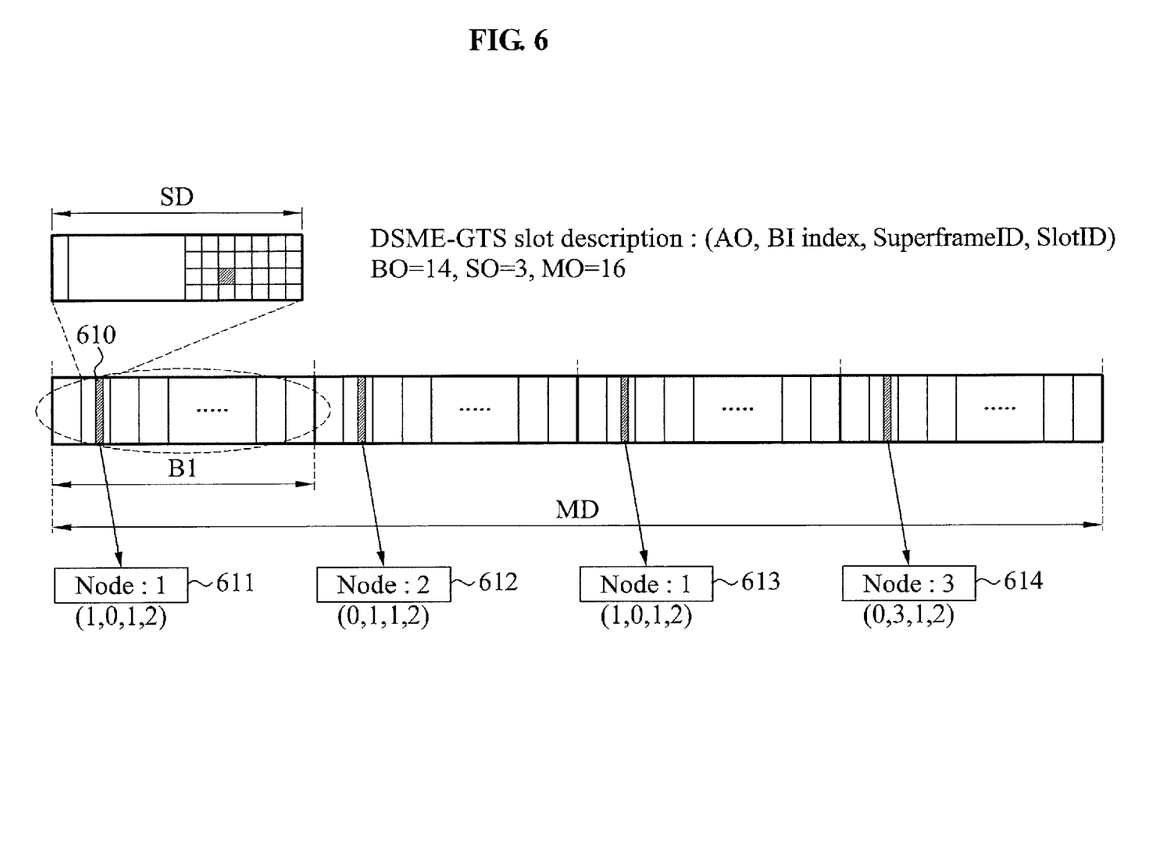
FIG. 6 illustrates a time slot allocation location using a parameter according to an exemplary embodiment.

FIG. 6 illustrates a time slot allocation location using at least one parameter according to an exemplary embodiment.

In a conventional DSME MAC mode, when a time slot is allocated for communications between node devices, allocation of a slot is made by an MD. For example, when node devices A and B are allocated a second time slot of a first superframe for communications via a time slot allocation procedure, a time slot is automatically allocated to a corresponding location in a second multi-superframe in the same BI. Thus, allocation of a time slot for communications between the two node devices is made by a multi-superframe, which is applied to all node devices in the same network on a common allocation cycle.

In an application service such as utility monitoring, different types of monitoring data in a modest amount of information are periodically collected and transmitted to a coordinator, in which a monitoring data collection cycle may be different depending on a monitoring data type.

Thus, the conventional DSME MAC mode having the same time slot allocation cycle may not support application services with different data generation cycles.

To resolve such an issue, an AO may be added to a multi-superframe as a control parameter. An AO-added time slot allocation cycle may be expressed by Equation 8.

$$\text{Time slot allocation cycle} = 2^{(MO-BO)}/2^{(AO)} \qquad \text{[Equation 8]}$$

Referring to FIG. 6, a location of a time slot allocated to a node device may be indicated through an AO, a BI Index, a SuperframeID, and a SlotID, and the time slot may be included in a particular location of a BI 610, expressed in 611 to 614.

The AO may be set for each of the two node devices time slots for which time slots are to be allocated by a random selection of a positive integer, and a location of a time slot may be designated using a BI Index, SuperframeID, and SlotID in allocation of the time slot.

The BI index is an identification index of a BI associated with a location to which the time slot is allocated within an MD and represents sequence numbers of a plurality of BIs present in one MD. As for the BI index, a first BI in which a personal area network (PAN) coordinator transmits a beacon in the MD is defined as a BI index 0, and subsequent BIs have sequence numbers in ascending order. Transitively, a BI index may represent a BI in which a relevant time slot is present.

The SuperframeID is an identification index of a superframe associated with a location of the AO with respect to the time slot within the BI and represents a sequence of numbers for a plurality of superframes present in the BI. As for the SuperframeID, a first superframe in which the PAN coordinator transmits a beacon in the BI is defined as a SuperframeID 0. In addition, subsequent superframes have an ascending sequence of numbers, and a SuperframeID may represent a superframe in which a relevant time slot is present.

The SlotID is an identification index of the time slot, within the BI, representing a sequence of numbers for a plurality of time slots present in the BI. A first time slot of a first superframe in which the PAN coordinator transmits a beacon in the BI is defined as 0, and subsequent time slots have a sequence of ascending numbers. In this instance, a beacon transmission period and a CAP are excluded from the sequence of numbers, and a sequence of numbers for the corresponding time slots may be represented by SlotIDs.

Figure 7:
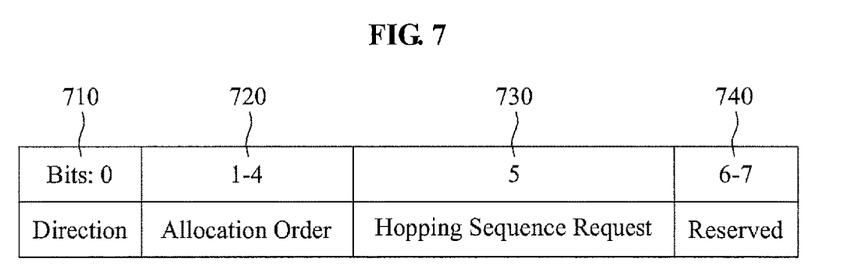
FIG. 7 illustrates a structure of an extended Deterministic and Synchronous Multichannel Extension-Guaranteed Time Slot (DSME)-GTS Allocation field according to an exemplary embodiment.

FIG. 7 illustrates a structure of an extended DSME-GTS Allocation field according to an exemplary embodiment.

The node device 400 goes through a network association procedure and a time slot allocation procedure until the node device 400 is allocated a time slot for communication.

In a network using a DSME MAC protocol, three command frames including DSME-Allocation Request, Response, and Beacon Allocation Notification command frames and three command frames including DSME-GTS Request, Reply, and Notify command frames are exchanged in the network association procedure and in the time slot allocation procedure, respectively, for allocation of a time slot.

In view of power used for communications occupying a considerable portion of power consumed by the node device, a method of allocating communication resources using a plurality of command frames shortens lifetimes of the node device and the network.

Further, since the command frames are transmitted and received by accessing a channel in random access mode, when a collision between frames occurs, an inconvenience of the procedures being repeated is experienced, and involves additional power consumption.

Thus, to minimize power consumption, a combination of the network association procedure and the time slot allocation procedure, performed as follows, may be introduced.

First, the node device 400 receives a periodically broadcasted beacon to join a network and obtains a multi-superframe structure, a channel diversity mode, and a time synchronization specification managed in the network through the beacon.

Subsequently, the node device 400 joins the network using DSME-Association Request and DSME-Association Response commands used in the conventional DSME MAC. Here, a node device wishing to join the network selects at least one adjacent node device transmitting the beacon and transmit the DSME-Association Request command thereto.

In this instance, the DSME-Association Request command may include information for allocation of a time slot resource on a network association method selected from the method defined in the conventional DSME MAC and the integrated procedure when joining the network.

When the node device 400 receives the DSME-Association Request command, the node device 400 transmits the DSME-Association Response command including information about a result of the network association request and time slot allocation information using resource information thereof, thereby terminating the integrated procedure.

The DSME-Association Request command may be defined by adding a DSME Association Type field and an Extended DSME-GTS Allocation field to the DSME-Association Request command defined in the DSME MAC standard.

The DSME Association Type field is a field with a one bit length of '0' or '1.' The DSME Association Type field may be set to '0' in the conventional DSME MAC association procedure and set to '1' in the integrated association procedure.

The Extended DSME-GTS Allocation field may be activated when the DSME Association Type field is '1'. The Extended DSME-GTS Allocation field may include information for a request for allocation of a time slot and have a configuration shown in FIG. 7.

Referring to FIG. 7, a Direction sub-field 710, which indicates whether a requested time slot is for transmission or reception, may be set to '1' for transmission and to '0' for reception.

An Allocation Order sub-field 720 may include the AO of FIG. 6. A Hopping Sequence Request sub-field 730, determined based on a macHoppingSequenceID defined in the conventional DSME MAC standard, is set to '1' when the macHoppingSequenceID is '1', and to '0' of other conditions.

Figure 8:
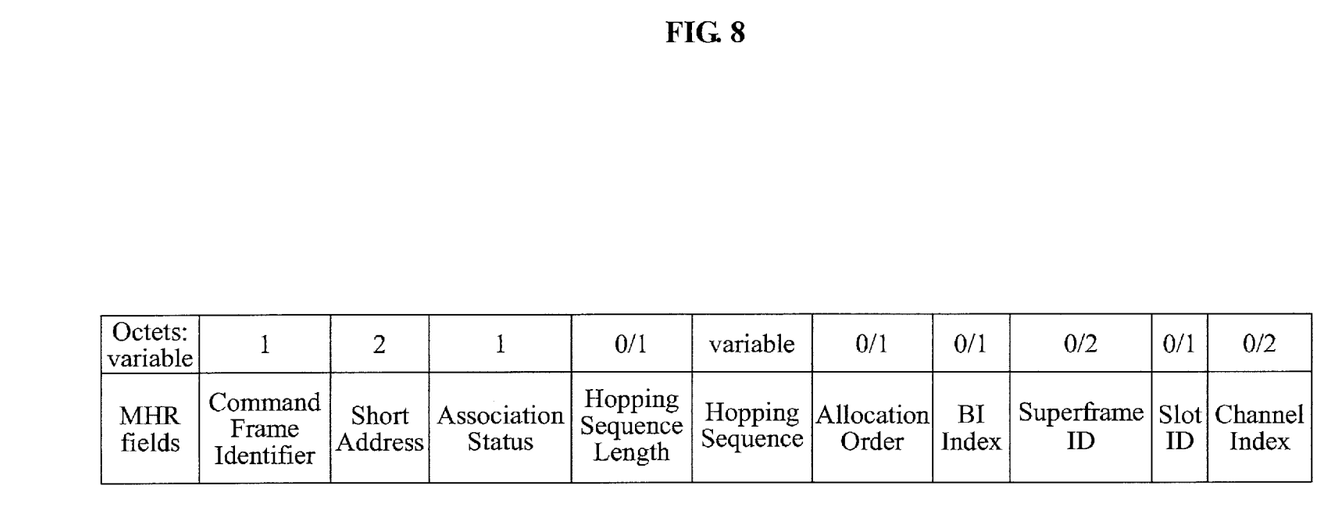
FIG. 8 illustrates a structure of a DSME-Association Response command according to an exemplary embodiment.

FIG. 8 illustrates a structure of the DSME-Association Response command according to an exemplary embodiment.

The DSME-Association Response command may be defined by adding an Allocation Order field, a BI Index field, a SuperframeID field, a Slot ID field, and a Channel Index field to the DSME-Association Response command defined in the DSME MAC standard and further adding a status value of an Association Status field thereto.

Here, the Allocation Order field includes the AO of FIG. 5, and the BI Index field, the SuperframeID field, and the Slot ID field may have index information values to indicate a location of a time slot to be allocated.

Further, the Channel Index field, which is activated in operation in a channel adaptation mode of a channel diversity mode, may include a channel value used in a time slot to be allocated.

The conventional DSME MAC defines a type of hopping sequence used in the network based on a macHoppingSequenceID.

When the macHoppingSequenceID is '0', the PAN coordinator generates a hopping sequence to be used in the network and notifies a node device joining the network of the hopping sequence.

Thus, in the integrated procedure by the node device 400, when the macHoppingSequenceID included in beacon information for broadcasting is 0, a node device wishing to join the network may make a network association request by setting a Hopping Sequence Request sub-field value present in the Extended DSME-GTS Allocation field of the DSME-Association Request command to '1' to maintain compatibility in operation with the conventional DSME MAC.

When the node device receives the DSME-Association Request command, the node device may activate the Hopping Sequence Length field and the Hopping Sequence field of the DSME-Association Response command, insert relevant information into the command, and transmit the command.

Figure 9:
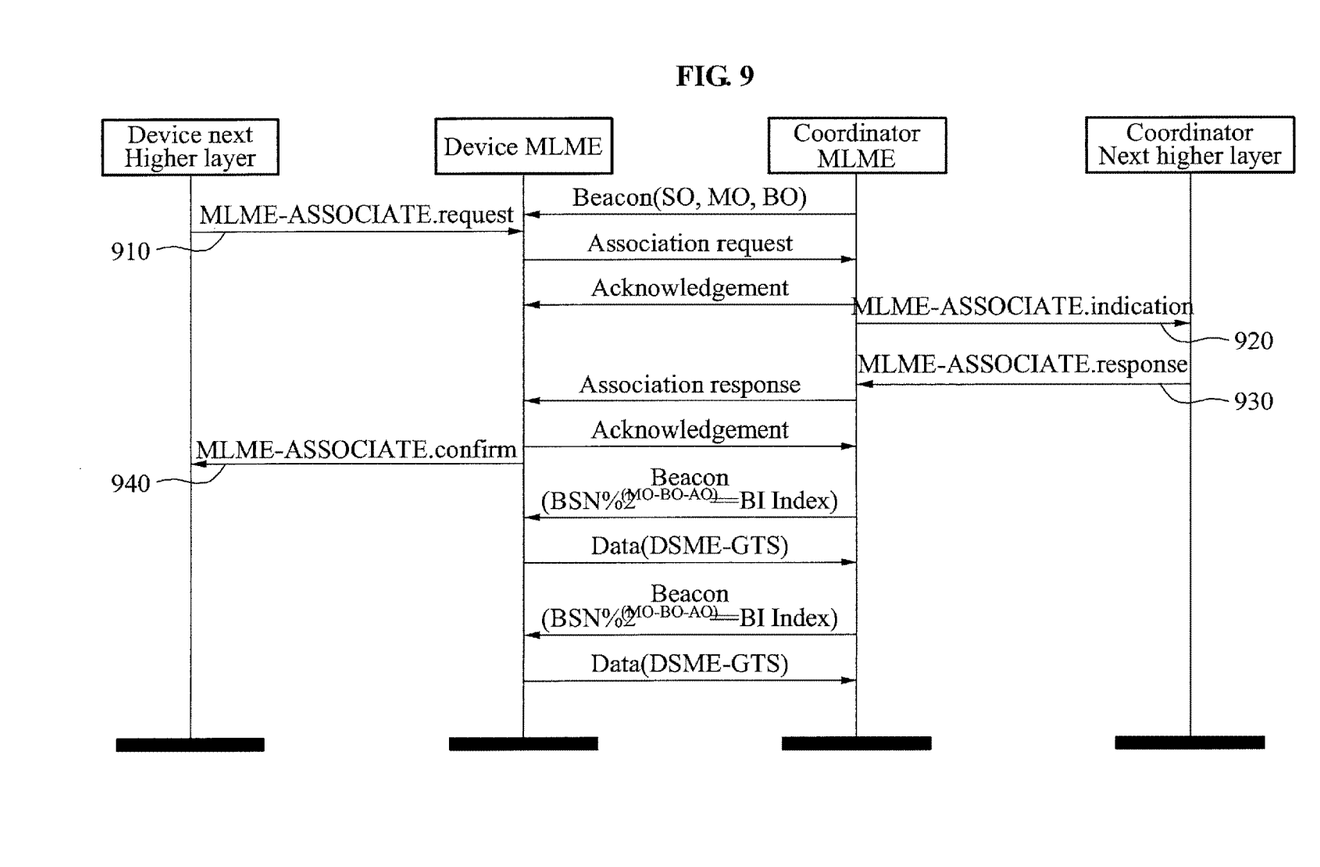
FIG. 9 illustrates a sequence of messages in an integrated network association procedure using an extended DSME Media Access Control (MAC) according to an exemplary embodiment.

FIG. 9 illustrates a sequence of messages in the integrated network association procedure using the extended DSME MAC according to an exemplary embodiment.

In a DSME-enabled PAN, devices may be allocated DSME-GTSs in an association procedure.

When 'macExtendedDSMEenabled' is TRUE, a device joins the PAN through an MLME-ASSOCIATE.request primitive 910 having a DSME-AssociationType parameter set to 1, and transmits a DSME-Association Request command along with an extended DSME-GTS allocation field to a coordinator, thereby requesting DSME-GTS allocation.

The MLME-ASSOCIATE.request 910 may include DSMEAssociationType, Direction, AllocationOrder, and HoppingSequenceRequest sub-fields.

When the DSME-Association Request command is received, an MAC sub-layer of the coordinator notifies a next higher layer associated with a request for allocation of a DSME-GTS of the DSME-Association Request command along with the DSMEAssociationType parameter set to '1' through an MLME-ASSOCIATE.indication primitive 920.

The MLME-ASSOCIATE.indication 920 may include DSMEAssociationType, Direction, AllocationOrder, and HoppingSequenceRequest sub-fields.

The next higher layer of the coordinator may instruct the MAC sub-layer to respond to the request for DSME-GTS allocation through an MLME-ASSOCIATE.response primitive 930.

The MLME-ASSOCIATE.response 930 may include DSMEAssociationType, AllocationOrder, BIIndex, SuperframeID, SlotID, ChannelIndex, HoppingSequenceLength, and HoppingSequence sub-fields.

Then, the MAC sub-layer transmits a DSME-Association response command including DSME-GTS allocation information to the device.

When the DSME-Association response command is received, an MAC sub-layer of the device allocates a DSME-GTS and an allocation result to a next higher layer through an MLME-ASSOCIATE.confirm primitive 940. The MLME-ASSOCIATE.confirm 940 may include DSME-AssociationType, AllocationOrder, BIIndex, SuperframeID, SlotID, ChannelIndex, HoppingSequenceLength, and HoppingSequence sub-fields.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy discs, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method of communicating between nodes in a network with a multi-superframe structure, the method comprising:
   requesting with at least one of said nodes an association at the network by requesting a Deterministic and Synchronous Multichannel Extension (DSME)-Guaranteed Time Slot (GTS) by transmitting an Association Request command for the association; and
   receiving a response for the request from the network;
   wherein the node includes a configuration unit for configuring a superframe order (SO), a beacon order (BO), and a multi-superframe order (MO), which are related by the following equation:

$$SO \leq MO \leq [BO + \text{len}(BSN)],$$

wherein the len(BSN) denotes a value related to a body sensor network (BSN), and a value of the MO is configured to be larger than a value of the BO,
   wherein the Association Request command comprises a DSME Association Type field and an Extended DSME-GTS Allocation field, and
   wherein if at least one of the nodes requesting the association requests DSME-GTS during the association, the DSME Association Type field is set to one.

2. The method of claim 1, wherein the len(BSN) has a value of 8 when an enhanced beacon frame has a Sequence Number Field, and has a value of 0 when the Sequence Number Field is absent.

3. The method of claim 1, wherein the Extended DSME-GTS Allocation field comprises a Direction field indicating a direction of DSME-GTS.

4. The method of claim 3, wherein the Direction field is set to zero if an allocation is for transmission, and is set to one if the allocation is for reception.

5. The method of claim 1, wherein the receiving comprises receiving an Association Response command for the response, and wherein the Association Response command comprises at least one of an Allocation Order field, a BI Index field, a SuperframeID field, and a Slot ID field.

6. A method of allocating a time slot for communication between nodes in a network, the method comprising:
   requesting association at the network; and
   receiving a response for the request;
   wherein the requesting comprises requesting a Deterministic and Synchronous Multichannel Extension (DSME)-Guaranteed Time Slot (GTS) by transmitting an Association Request command for the association,
   wherein the Allocation Order field is set a value of an allocation order (AO), and the time slot allocation interval is determined based on the AO, and wherein the time slot allocation interval is related to the following equation: $2^{(MO-BO)}/2^{(AO)}$, wherein BO denotes a beacon order and MO denotes a multi-superframe order.

7. The method of claim 6, wherein the receiving comprises
receiving an Association Response command for the response, and
wherein the Association Response command comprises an Allocation Order field indicating a time slot allocation interval.

8. The method of claim 7, wherein the Association Response command further comprises at least one of a BI Index field, a SuperframeID field, a Slot ID field.

9. A method of allocating a time slot for communication between nodes in a network, the method comprising:
receiving an Association Request command for association at the network; and
transmitting an Association Response command including an Allocation order field indicating a time slot allocation interval in response to the Association Request command;
wherein the Allocation Order field is set a value of an allocation order (AO), and the time slot allocation interval is determined based on the AO,
wherein the time slot allocation interval is related to the following equation: $2^{(MO-BO)}/2^{(AO)}$, and wherein BO denotes a beacon order and MO denotes a multi-superframe order.

10. The method of claim 9, wherein the Association Response command further comprises at least one of a BI Index field, a SuperframeID field, a Slot ID field.

11. The method of claim 9, wherein the BI Index field comprises an index of beacon interval (BI), the SuperframeID field comprises an index of a superframe, and the Slot ID field comprises a channel number of the time slot.

* * * * *